United States Patent [19]

Raftis

[11] Patent Number: 4,603,864
[45] Date of Patent: Aug. 5, 1986

[54] SEALING ARRANGEMENT FOR KNIFE GATE VALVES

[75] Inventor: George S. Raftis, Pittsburgh, Pa.

[73] Assignee: Red Valve Company, Inc., Carnegie, Pa.

[21] Appl. No.: 744,692

[22] Filed: Jun. 14, 1985

[51] Int. Cl.[4] .......................... F16J 15/12; F16K 3/22
[52] U.S. Cl. ........................................ 277/12; 277/50; 277/165; 277/166; 251/328; 251/333
[58] Field of Search .................. 137/516.29; 251/328, 251/332–334; 277/12, 32, 50, 165, 166

[56] References Cited

U.S. PATENT DOCUMENTS

| 2,870,987 | 1/1959 | Greenwood | 251/328 X |
| 3,076,631 | 2/1963 | Grove | 251/328 X |
| 3,207,471 | 9/1965 | Williams | 251/328 |
| 3,301,523 | 1/1967 | Lowrey | 251/328 X |
| 3,893,675 | 7/1975 | Geffroy | 277/165 X |
| 4,163,544 | 8/1979 | Fowler et al. | 251/328 |

FOREIGN PATENT DOCUMENTS

| 1095604 | 12/1960 | Fed. Rep. of Germany | 251/332 |
| 1009461 | 11/1965 | United Kingdom | 251/328 |

Primary Examiner—Robert S. Ward
Attorney, Agent, or Firm—Kirschstein, Kirschstein, Ottinger & Israel

[57] ABSTRACT

A valve seat in a knife gate valve is positively retained between a liner and a retaining ring.

4 Claims, 2 Drawing Figures

SEALING ARRANGEMENT FOR KNIFE GATE VALVES

BACKGROUND OF THE INVENTION

1. Field of the Invention

This invention generally relates to a knife gate valve and, more particularly, to a sealing arrangement for securely retaining a valve seat within the valve against removal therefrom, and for preventing the valve seat from becoming packed with debris.

2. Description of the Prior Art

Knife gate valves are well known. It is also known to retain the valve seat of such a valve by several different types of seat-retention arrangements. For example, the valve seat may be adhered in place within the body of the valve by the use of adhesives. Alternatively, the valve seat may be pressed into place. In another variant, the valve seat may be retained in place with the use of retaining wires. In another mounting technique, the valve seat may be molded integrally as part of an elastomeric liner mounted within the valve body.

Although the known seat-retention arrangements have been generally satisfactory in use, they have not proven to be altogether reliable in operation, primarily because the valve seats, particularly for large-sized valves, are prone to being dislodged from their mounting and are prone to being packed with debris. During flow of a pressurized medium, even a low-pressurized medium, through the valve, the seat can be pulled out of its mounting due, among other things, to a pressure differential existing between the upstream and downstream sides of the seat, thereby destroying the utility of the valve seat and the valve itself.

SUMMARY OF THE INVENTION

1. Objects of the Invention

It is a general object of this invention to avoid the aforementioned drawbacks of prior art knife gate valves.

It is another object of this invention to reliably prevent a knife gate valve seat from becoming dislodged from its mounting.

It is a further object of this invention to reliably prevent a knife gate valve seat from becoming packed with debris during use.

It is still another object of this invention to provide a durable sealing arrangement for a knife gate valve which is inexpensive to manufacture, simple to install, inexpensive to construct and reliable in operation.

2. Features of the Invention

In keeping with these objects, and others which will become apparent hereinafter, one feature of this invention, briefly stated, resides in a knife gate valve for controlling the flow of a pressurized medium along a path in which a sealing arrangement is provided. The sealing arrangement comprises a valve body having an internal flow-through passage which extends along an axis. The arrangement further comprises a liner having upstream and downstream annular flange portions, and an annular liner portion located between the flange portions. The flange and liner portions engage and are mounted on the valve body. The liner portion circumferentially bounds, at least in part, the passage, and has an annular stop extending radially inwardly into the passage.

The sealing arrangement also comprises an annular seat of sealing material, and having a generally L-shaped cross-section. The seat has an outer stepped surface mounted on and sealingly engaging the stop and the liner portion, and an inner surface located radially inwardly of the outer stepped surface. The seat also has an upstream surface located upstream of the stop, and a downstream sealing surface located downstream of the stop.

A retainer ring has an annular upstream flange which engages the upstream flange portion of the liner, and a retaining portion having an axially-extending surface which sealingly engages the inner surface of the seat, and a radially-extending surface sealingly engaging the upstream surface of the seat. The retaining portion and the liner bound a cavity in which the seat is securely retained against removal during the flow of the medium through the valve. The retaining portion also bounds an internal flow-through section which extends along the axis.

The valve also comprises a knife gate mounted on the body intermediate the flow-through passage and the flow-through section. The gate is movable between a fully-open position in which the gate is remote from the seat, and a fully-closed position in which the gate sealingly engages the sealing surface of the seat.

Hence, in accordance with this invention, the seat for the knife gate valve is reliably prevented from being removed or dislodged from its mounting within the cavity. In addition, the valve seat, due to its confinement over its entire outer stepped surface, inner surface and upstream surface, is reliably protected against becoming packed with debris.

In a preferred embodiment of this invention, the seat is constituted, in part, of an elastomeric material, e.g. rubber, and also includes a metallic core ring embedded within the elastomeric material. To provide for a more positive retention of the valve seat within the valve, the core ring is located upstream of the stop. Alternatively, the seat advantageously may be made of Teflon material.

In accordance with another feature of this invention, an auxiliary pressure seal, e.g. a gasket, preferably made of Teflon material, is sealingly mounted between the upstream flange portion of the liner and the upstream flange of the retainer ring.

This invention has particular utility for large-sized valves whose internal flow-through section of the retainer ring has an internal diameter on the order of 8" and more, and in which the pressure of the pressurized medium flowing through the valve ranges from about 10 psi to about 150 psi.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
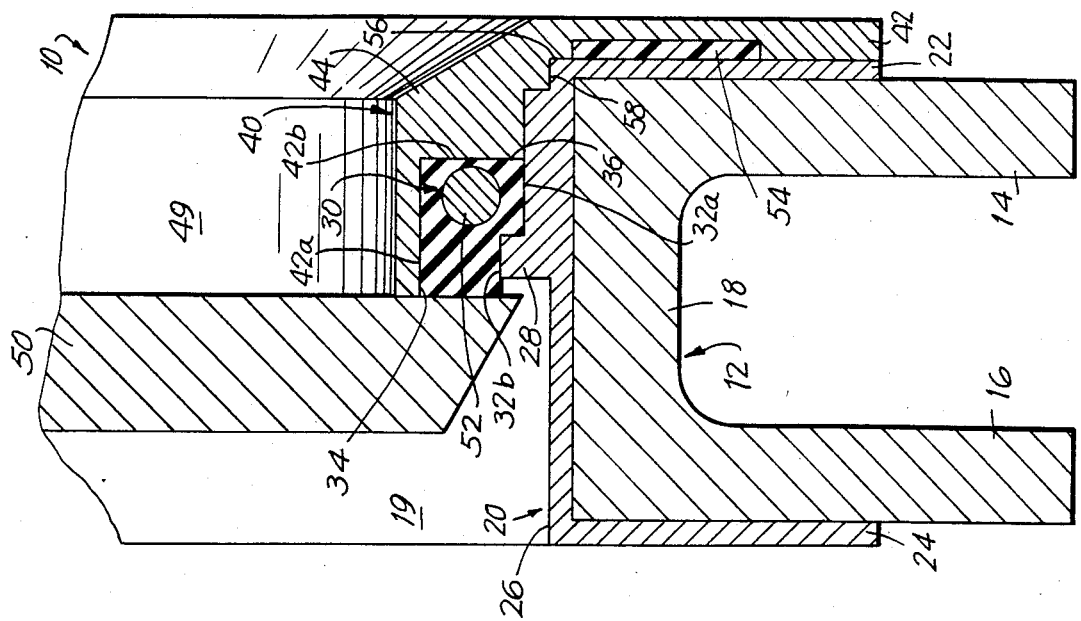
FIG. 1 is a broken-away cross-sectional view of a sealing arrangement for a knife gate valve in an open state in accordance with this invention.

Referring now to the drawings, reference numeral 10 generally identifies a knife gate valve for controlling the flow of a pressurized medium along a path extending in the direction of arrow A in FIG. 1. The valve 10 comprises a valve body 12, preferably made of cast iron, and having, as considered in the flow direction, an upstream annular skirt 14, a downstream annular skirt 16, and an annular bridge 18 located between the skirts 14, 16. It will be understood that only the lower half of the knife gate valve has been shown in the drawings, and that the non-illustrated upper half of the valve is mirror symmetrical to the lower half and has not been shown for the sake of not unduly encumbering the drawings. The valve body 12 has an internal flow-through passage 19 which extends along an axis along the flow direction indicated by arrow A.

The valve also comprises a liner 20 having an upstream annular flange portion 22, a downstream annular flange portion 24, and an annular liner portion 26 located between the flange portions 22, 24. All of the liner portions engage and are mounted on the valve body 12. The liner portion 26 circumferentially bounds, at least in part, the passage 19. An annular stop 28 extends from the liner portion 26 in a radially-inward direction into the passage 19.

In accordance with this invention, an annular seat 30 of sealing material is provided with a generally L-shaped cross-sectional configuration. The seat 30 has an outer stepped surface 32 mounted on and sealingly engaging the stop 28 and the liner portion 26, an inner surface 34 located radially inwardly of the outer stepped surface 32, an upstream surface 36 located upstream of the stop 28, and a downstream sealing surface 38 located downstream of the stop 28. Advantageously, the inner surface 34 extends linearly in an axial direction, the upstream surface 36 extends generally perpendicularly to the inner surface 34, the downstream sealing surface 38 is convexly curved and has an outwardly-bulged surface, and the outer stepped surface 32 has an axially-extending surface 32a which is parallel to inner surface 34, and another axially-extending surface 32b which is parallel to the first-mentioned surface 32a but at a radial offset therefrom. As shown in FIG. 1, the surface 32b rests on top of the stop 28, and the surface 32a is located upstream of the stop 28.

The valve also comprises a retainer ring 40 having an annular upstream flange 42 which engages the upstream flange portion 22 of the liner 20, and a retaining portion 44 having an axially-extending surface 42a sealingly engaging the inner surface 34 of the seat 30, and a radially-extending surface 42b sealingly engaging the upstream surface 36 of the seat 30. The retaining portion 44 and the liner 20 bound a cavity 46 in which the seat 30 is securely retained against remval during the flow of the medium. In addition, the retaining portion 44 bounds an internal flow-through section 49 which extends along and is co-linear with the axis along which the flow-through passage 19 extends.

Figure 2:
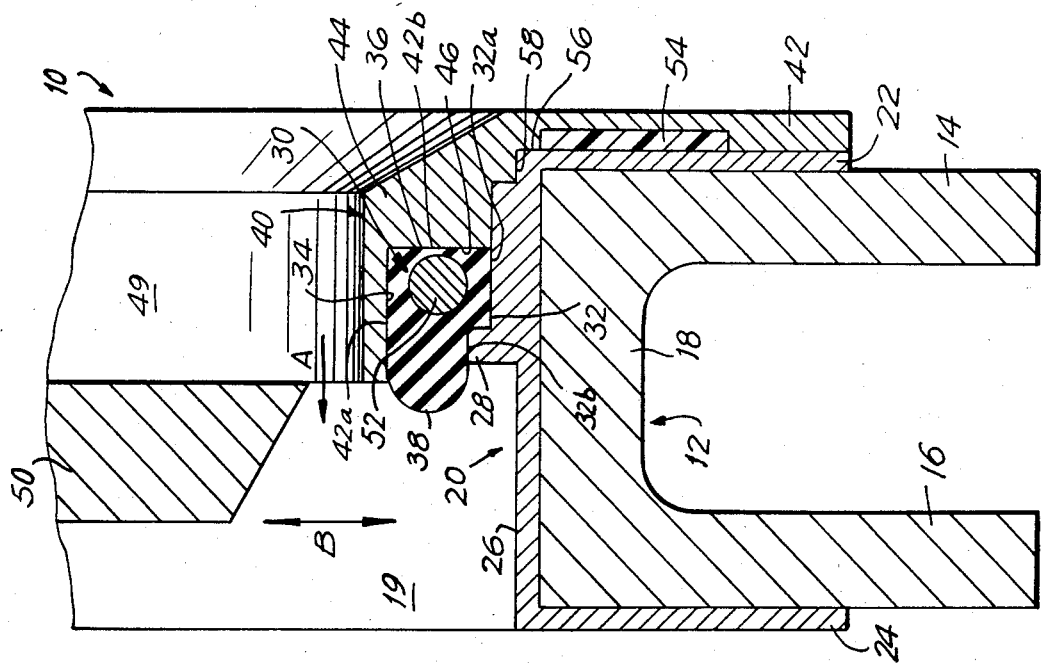
FIG. 2 is a view analogous to FIG. 1, but showing the valve in a closed state.

A knife gate 50, preferably made of stainless steel, is mounted on the valve intermediate the flow-through passage 19 and the flow-through section 49 for reciprocating movement in the direction of double-headed arrow B between an open position, as shown in FIG. 1, in which the gate 50 is remote from the seat 30, and a fully-closed position, as shown in FIG. 2, in which the gate 50 sealingly engages the sealing surface 38 of the seat 30.

The knife gate 50 may be driven either manually by hand, or automatically by either a spring, a pneumatic piston-and-cylinder unit, or by any electrical, mechanical or hydraulic power drive.

Due to the close, intimate contact between the inner surface 34 of the seat and the surface 42a of the ring 40, and the close, intimate contact between the upstream surface 36 and the surface 42b of the ring, and the close, intimate contact between the surface 32a of the seat and the liner portion 26, and the close, intimate contact between the surface 32b of the seat 30 and the stop 28, the seat is reliably retained against removal during the flow of the medium, and is not dislodged from the cavity 46 despite any pressure differential which exists between the upstream and downstream sides of the valve 10. In addition, the aforementioned close, intimate contact between the seat, on the one hand, and the liner and ring, on the other hand, ensures that no debris from the pressurized medium will become entrapped within the cavity 46.

To even further improve the retaining action of the seat 30 within the cavity 46, this invention further proposes embedding a metallic core ring 52, preferably of circular cross-section, within the seat 30 which is preferably constituted of an elastomeric material such as rubber. As shown in FIG. 1, the core ring 52 is located upstream of the stop 28 and, in the event that external forces are applied to the seat to remove the same in a downstream direction, the core ring 52 will, at least in part, engage the stop, thereby preventing such dislodgement.

An auxiliary pressure seal or gasket 54 may also be provided between the annular flange portion 22 and the flange 42 to serve as a secondary seal to prevent the pressurized medium within the valve body from escaping to the exterior thereof.

For even greater retention, the retaining section 44 may also be provided with a stepped shoulder 56 which matingly conforms to a correspondingly-shaped stepped shoulder 58 on the liner 20.

Advantageously, the liner 20 may be made of stainless steel, and the retainer ring is likewise made of stainless steel.

The aforementioned arrangement has particular utility for large-sized valves wherein the flow-through section of the ring 40 has an internal diameter on the order of 8" and more. In addition, the pressure of the pressurized medium can range anywhere from 10 psi to about 150 psi.

When the diameter of the flow-through section of the valve is less, then it is advantageous if the valve seat is not made of rubber with a metal core ring embedded therein, but, instead, is constructed entirely of a plastic material such as Teflon.

It will be understood that each of the elements described above, or two or more together, also may find a useful application in other types of constructions differing from the types described above.

While the invention has been illustrated and described as embodied in a sealing arrangement for knife gate valves, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a knife gate valve for controlling the flow of a pressurized medium along a path, a sealing arrangement comprising:
   (a) a valve body having an internal flow-through passage which extends along an axis;
   (b) a liner having upstream and downstream annular flange portions and an annular liner portion located between the flange portions, all of the liner portions engaging and being mounted on the valve body, said liner portion circumferentially bounding, at least in part, the passage and having an annular stop extending radially inwardly into the passage;
   (c) an annular seat of sealing material and having a generally L-shaped cross-section, said seat having an outer stepped surface mounted on and sealingly engaging the stop and the liner portion, an inner surface located radially inwardly of the outer stepped surface, an upstream surface located upstream of the stop, and a downstream sealing surface located downstream of the stop;
   (d) a retainer ring having an annular upstream flange engaging the upstream flange portion of the liner, and a retaining portion having an axially-extending surface sealingly engaging the inner surface of the seat and a radially-extending surface sealingly engaging the upstream surface of the seat, said retaining portion and said liner bounding a cavity in which the seat is securely retained against removal during the flow of the medium, said retaining portion bounding an internal flow-through section extending along the axis; and
   (e) a knife gate mounted on the body intermediate the flow-through passage and the flow-through section for movement between a fully-open position in which the gate is remote from the seat, and a fully-closed position in which the gate sealingly engages the sealing surface of the seat.

2. The sealing arrangement as recited in claim 1, wherein the seat is constituted, in part, of elastomeric material, and also includes a metallic core ring embedded within the elastomeric material, said core ring being located upstream of the stop.

3. The sealing arrangement as recited in claim 1; and further comprising an auxiliary pressure seal sealingly mounted between the upstream flange portion of the liner and the upstream flange of the retainer ring.

4. The sealing arrangement as recited in claim 1, wherein the flow-through section of the ring has an internal diameter on the order of eight inches and more.

* * * * *